(12) United States Patent
Huang et al.

(10) Patent No.: US 10,725,567 B1
(45) Date of Patent: Jul. 28, 2020

(54) TOUCHPAD MODULE AND COMPUTING DEVICE USING SAME

(71) Applicant: PRIMAX ELECTRONICS LTD., Taipei (TW)

(72) Inventors: Tai-Sou Huang, Taipei (TW); Shao-Ju Yen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/578,474

(22) Filed: Sep. 23, 2019

(30) Foreign Application Priority Data

Jul. 19, 2019 (TW) .............................. 108125699 A

(51) Int. Cl.
*G06F 3/041* (2006.01)
*G06F 3/0354* (2013.01)
*G06F 1/16* (2006.01)

(52) U.S. Cl.
CPC ........ *G06F 3/03547* (2013.01); *G06F 1/1671* (2013.01); *G06F 1/1616* (2013.01)

(58) Field of Classification Search
CPC ... G06F 3/03547; G06F 1/1671; G06F 1/1616
See application file for complete search history.

(56) References Cited

U.S. PATENT DOCUMENTS

| 2007/0139388 A1* | 6/2007 | Lee ..................... G06F 3/0414 345/173 |
| 2014/0092064 A1* | 4/2014 | Bernstein ............. G06F 3/016 345/174 |

\* cited by examiner

*Primary Examiner* — Wing H Chow
(74) *Attorney, Agent, or Firm* — WPAT, PC

(57) ABSTRACT

A touchpad module includes a bracket member, a touch member, a supporting element and two elastic elements. The touch member is arranged between a first strip part and a second strip part of the bracket member. The supporting element is arranged between the elastic elements and the touch member. Each elastic element includes a swinging part, a fixing part and a shaft part. The fixing parts are installed on the first strip part and the second strip part, respectively. The swinging part and the fixing part are wider than the shaft portion. In response to an external force, the touch member is swung relative to the bracket member by using the shaft parts as fulcrums. While the touch member is swung, the shaft parts are subjected to deformation and the supporting element and the swinging parts are swung relative to the fixing parts.

14 Claims, 10 Drawing Sheets

US 10,725,567 B1

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in a casing 21 of the notebook computer 2. The touchpad module 1 is installed in the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 may be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

However, the conventional touchpad module 1 still has some drawbacks. For example, the supporting structure 11 is connected with the upper component and the lower component through iron elements or plastic structures (e.g., sponge structures). Consequently, as the iron elements or plastic structures are subjected to deformation, the touch member 13 can be swung upwardly or downwardly. Due to the design of the supporting structure 11, the upward/downward swinging action of the touch member 13 is usually aslant and unstable.

Therefore, there is a need of providing an improved touchpad module in order to overcome the above drawbacks.

SUMMARY OF THE INVENTION

An object of the present invention provides a touchpad module with a mechanism for increasing the swinging stability of a touch member.

Another object of the present invention provides a computing device with a touchpad module. The touchpad module includes a mechanism for increasing the swinging stability of a touch member.

The other objects and advantages of the present invention will be understood from the disclosed technical features.

In accordance with an aspect of the present invention, a touchpad module for a computing device is provided. The touchpad module includes a bracket member, a touch member, a supporting element and two elastic elements. The bracket member includes a first strip part and a second strip part, which are opposed to each other. The touch member is arranged between the first strip part and the second strip part. The supporting element is installed on the touch member. The supporting element is arranged between the two elastic elements and the touch member. Each of the elastic elements includes a swinging part, a fixing part and a shaft part between the swinging part and the fixing part. The swinging parts of the two elastic elements are respectively located at two opposite sides of the supporting element. The fixing parts of the two elastic elements are respectively installed on the first strip part and the second strip part. The swinging part and the fixing part are wider than the shaft portion. When an external force is applied to the touchpad module, the touch member is swung relative to the bracket member by using the shaft parts of the two elastic elements as fulcrums. While the touch member is swung, the shaft parts are subjected to deformation and the supporting element and the swinging parts are swung relative to the fixing parts.

In an embodiment, the touchpad module further includes two ribs. The two ribs are respectively installed on the corresponding swinging parts. The swinging parts are arranged between the corresponding ribs and the supporting element. The ribs are protruded from the corresponding swinging parts and extended in a first direction away from the swinging parts. The swinging parts are swung relative to the corresponding fixing parts by using the corresponding ribs as fulcrums.

In an embodiment, the ribs are extended in a second direction, and the first strip part and the second strip part of the bracket member are extended in a third direction. The first direction, the second direction and the third direction are in parallel with each other.

In an embodiment, each of the ribs has a curvy surface.

In an embodiment, the computing device further includes a battery, and the battery includes a top surface and a support plate. The top surface faces the touchpad module, the support plate is disposed on the top surface, and the ribs of the touchpad module are supported on the support plate.

In an embodiment, the computing device includes a fixing frame, and the touchpad module is disposed within the fixing frame. The fixing frame includes a bottom plate and a support plate. The touchpad module is supported by the bottom plate. The support plate is installed on the bottom plate. The ribs of the touchpad module are supported on the support plate.

In an embodiment, each of the fixing part and the swinging part has a width in a range between 5 mm and 10 mm, and the shaft part has a thickness in a range between 3 mm and 6 mm.

In an embodiment, a thickness of the elastic element is 0.1 mm.

In an embodiment, the touchpad module further includes a first adhesive layer, and the first adhesive layer is arranged between the supporting element and the touch member. The supporting element is attached on the touch member through the first adhesive layer.

In an embodiment, the touch member includes a circuit board and a covering plate. The circuit board is arranged between the covering plate and the supporting element. The supporting element is installed on the circuit board.

In an embodiment, the touchpad module further includes a second adhesive layer, and the second adhesive layer is arranged between the circuit board and the covering plate. The circuit board and the covering plate are combined together through the second adhesive layer.

In an embodiment, the touchpad module further includes a first fastening element and a second fastening element. Each of the fixing parts includes a first opening and a second opening, respectively. The first strip part and the second strip part include a first screw hole and a second screw hole, respectively. The first fastening element is penetrated through the first opening and tightened into the first screw hole, and the second fastening element is penetrated through the second opening and tightened into the second screw hole. Consequently, the fixing parts are respectively fixed on the first strip part and the second strip part.

In an embodiment, the bracket member further includes a third strip part, a fourth strip part and a triggering part. The third strip part and the fourth strip part are opposed to each other. The third strip part and the fourth strip part are arranged between the first strip part and the second strip part. The supporting element is located beside the third strip part. The triggering part is protruded from the fourth strip part and extended in a direction toward the third strip part. The triggering part is located under the touch member, and the touch member further includes a switch corresponding to the triggering part. When the external force is applied to the touchpad module, the touch member is swung toward the triggering part by using the shaft parts of the two elastic elements as the fulcrums, so that the switch is triggered by the triggering part.

In accordance with another aspect of the present invention, a computing device is provided. The computing device includes a casing, a processor and a touchpad module. The processor is disposed within the casing. The touchpad module is disposed within the casing and electrically connected with the processor. The touchpad module includes a bracket member, a touch member, a supporting element and two elastic elements. The bracket member includes a first strip part and a second strip part, which are opposed to each other. The touch member is arranged between the first strip part and the second strip part. The supporting element is installed on the touch member. The supporting element is arranged between the two elastic elements and the touch member. Each of the elastic elements includes a swinging part, a fixing part and a shaft part between the swinging part and the fixing part. The swinging parts of the two elastic elements are respectively located at two opposite sides of the supporting element. The fixing parts of the two elastic elements are respectively installed on the first strip part and the second strip part. The swinging part and the fixing part are wider than the shaft portion. When an external force is applied to the touchpad module, the touch member is swung relative to the bracket member by using the shaft parts of the two elastic elements as fulcrums. While the touch member is swung, the shaft parts are subjected to deformation and the supporting element and the swinging parts are swung relative to the fixing parts.

From the above descriptions, the present invention provides the touchpad module and the computing device with the touchpad module. The touchpad module comprises two elastic elements. Each elastic element comprises a swinging part, a fixing part and a shaft part. When an external force is applied to the touchpad module, the touch member is swung relative to the bracket member by using the shaft parts as fulcrums. Moreover, the width of the shaft part is smaller than the width of the swinging part and the width of the fixing part. During the process of swinging the touch member, the shaft parts are subjected to deformation. Consequently, the supporting element and the swinging parts are swung relative to the fixing parts. Due to this structural design, the swinging action of the touch member with respect to the bracket member is stable (i.e., not aslant). Moreover, since the structural design of the touchpad module is simple and the process of assembling the components of the touchpad module is easy, the fabricating cost is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
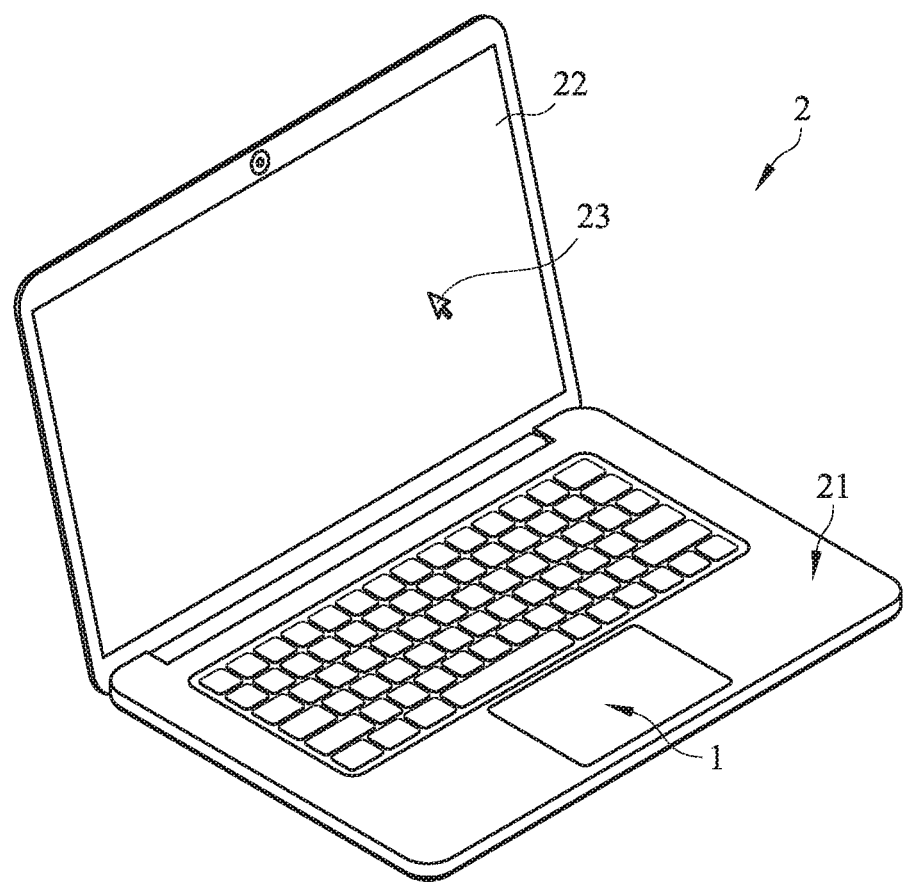
FIG. 1 schematically illustrates a conventional notebook computer with a touchpad module.
Figure 2:
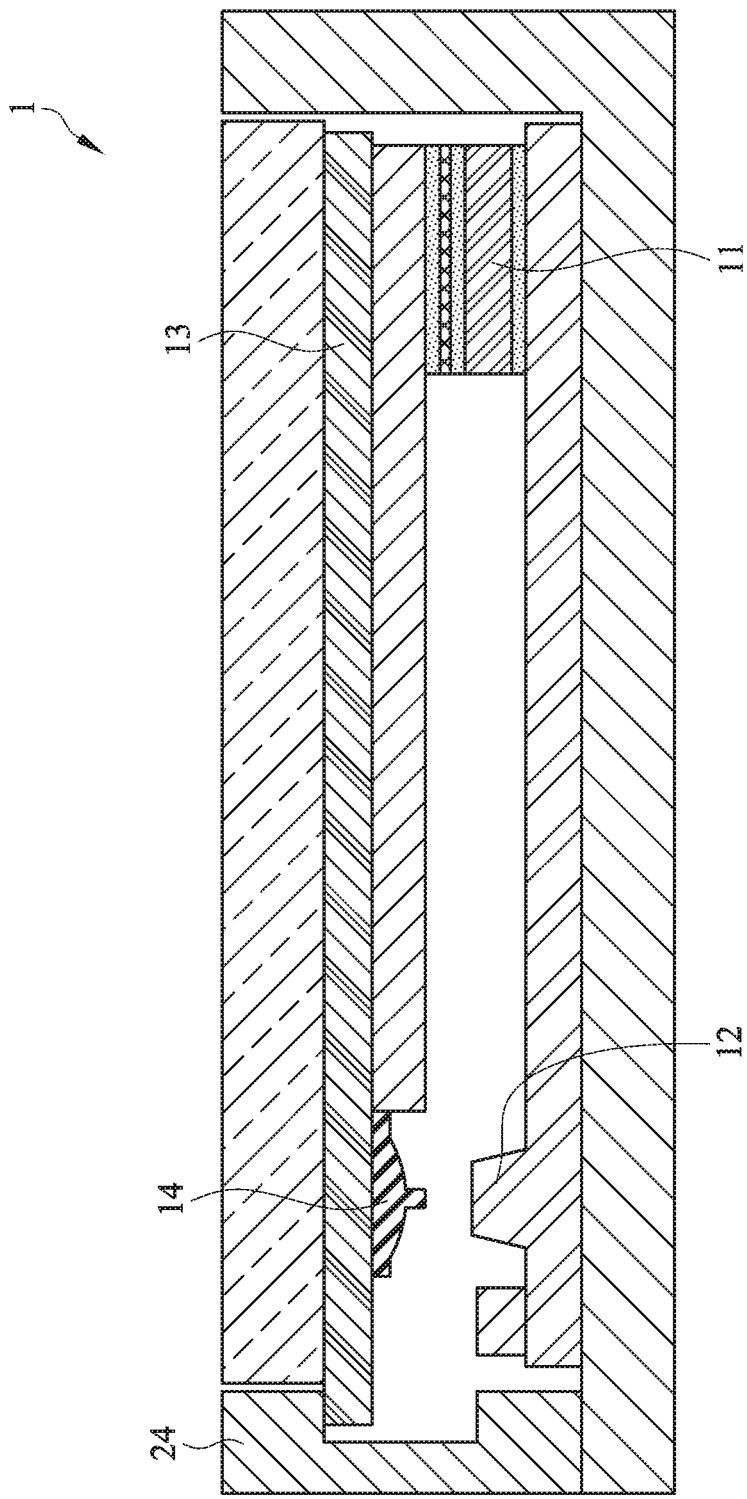
FIG. 2 is a schematic cross-sectional view illustrating the touchpad module as shown in FIG. 1, in which the touchpad module is not pressed down.
Figure 3:
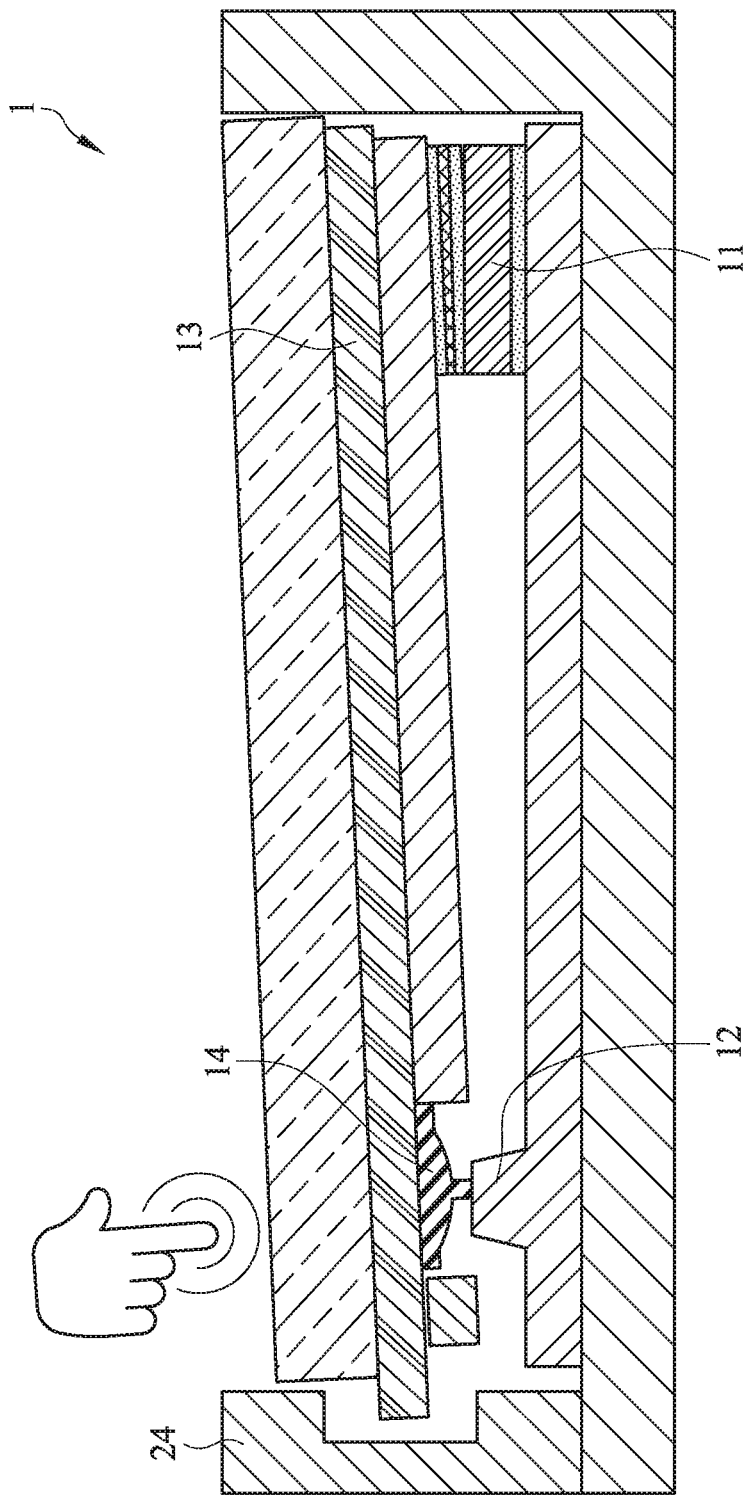
FIG. 3 is a schematic cross-sectional view illustrating the touchpad module as shown in FIG. 2, in which the touchpad module is pressed down.
Figure 4:
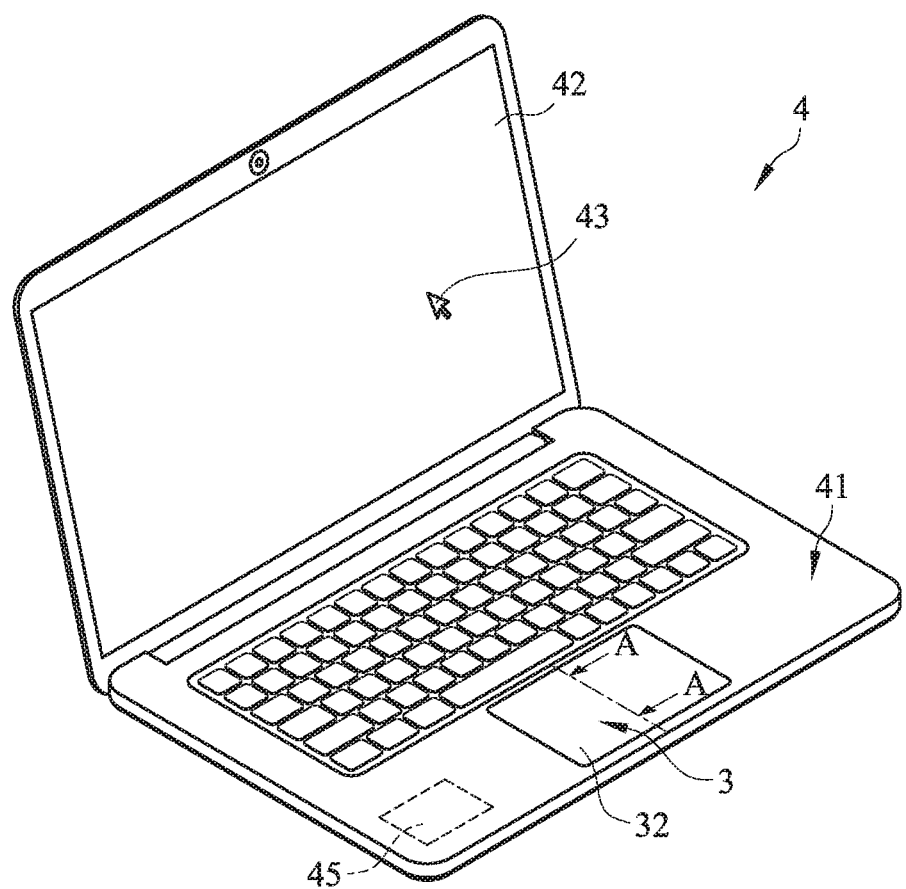
FIG. 4 is a schematic perspective view illustrating the outer appearance of a computing device with a touchpad module according to a first embodiment of the present invention.

FIG. 4 is a schematic perspective view illustrating the outer appearance of a computing device with a touchpad module according to a first embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. Moreover, the processor 41 is used for processing electronic signals of the computing device 4. Moreover, a fixing frame 44 is concavely formed in the casing 41 (see FIG. 5). The touchpad module 3 is disposed within the fixing frame 44 and electrically connected with the processor 45. In addition, at least a portion of the touchpad module 3 is exposed outside so as to be touched by the user's finger. Consequently, the user may operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed by the user's finger, the computing device 4 executes a specified function.

The other structure of the touchpad module 3 will be described in more details as follows.

Figure 5:
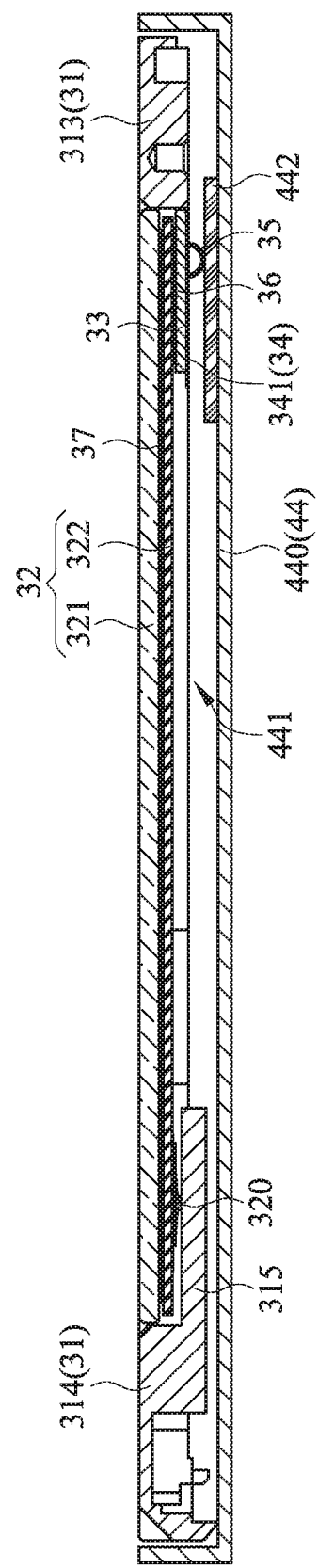
FIG. 5 is a schematic cross-sectional view illustrating the touchpad module as shown in FIG. 4 and taken along the line AA.
Figure 6:
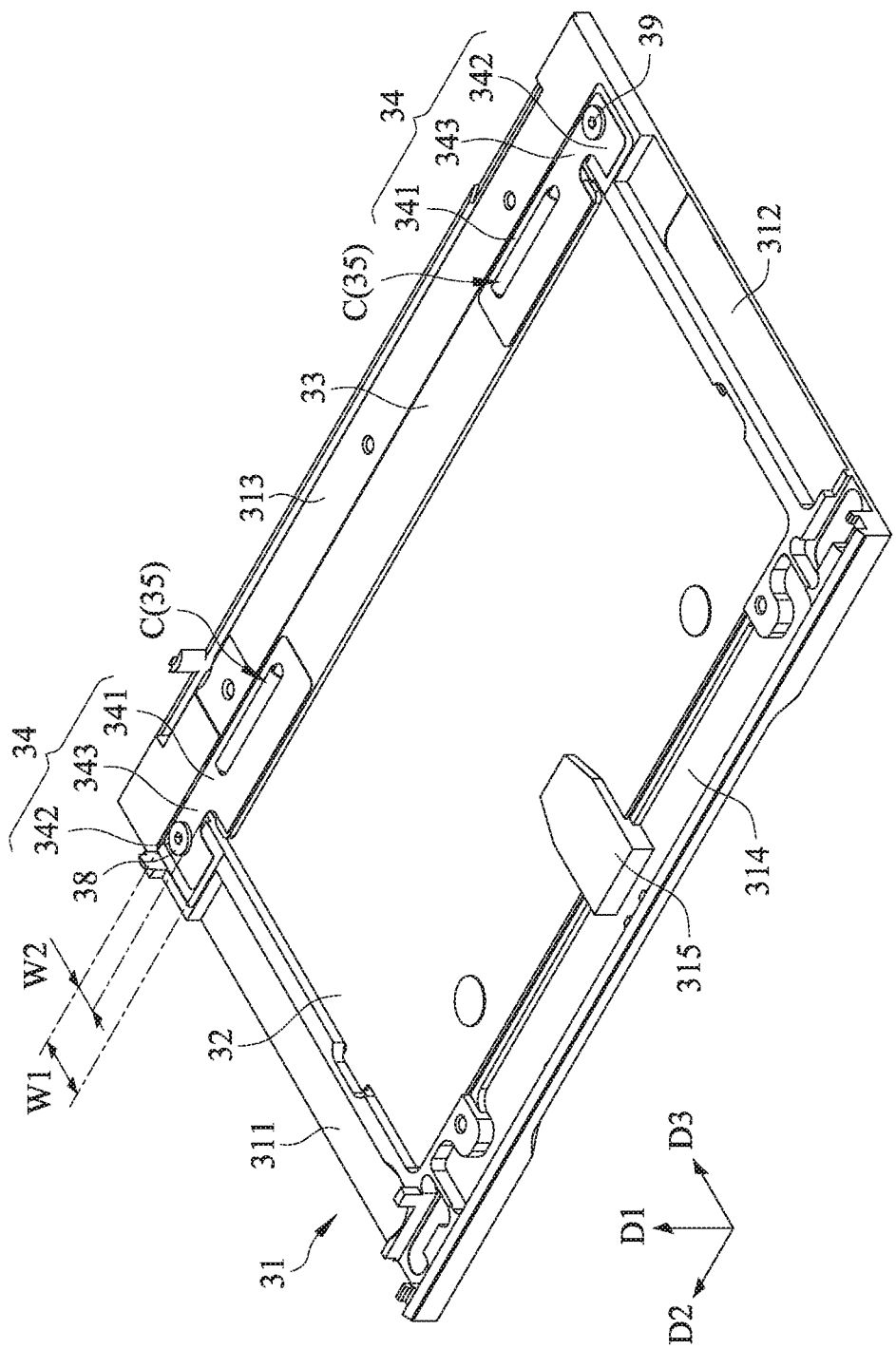
FIG. 6 is a schematic perspective view illustrating the touchpad module as shown in FIG. 5 and taken along the rear viewpoint.
Figure 7:
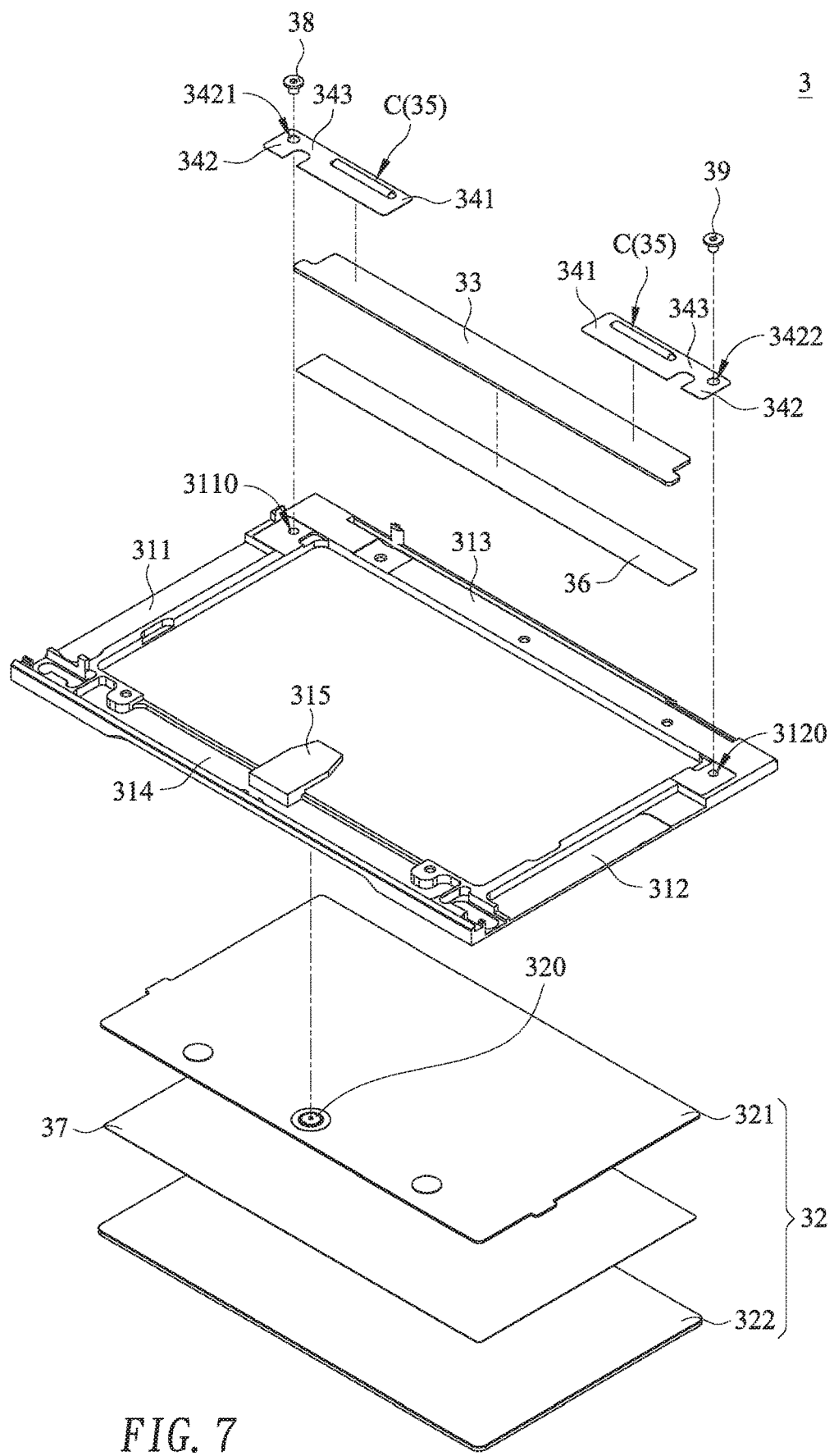
FIG. 7 is a schematic exploded view illustrating the touchpad module as shown in FIG. 6.

Please refer to FIGS. 5, 6 and 7. FIG. 5 is a schematic cross-sectional view illustrating the touchpad module as shown in FIG. 4 and taken along the line AA. FIG. 6 is a schematic perspective view illustrating the touchpad module as shown in FIG. 5 and taken along the rear viewpoint. FIG. 7 is a schematic exploded view illustrating the touchpad module as shown in FIG. 6.

As shown in FIG. 5, the fixing frame 44 of the computing device 4 comprises an accommodation space 441. The touchpad module 3 is accommodated within the accommodation space 441. As shown in FIGS. 5, 6 and 7, the touchpad module 3 comprises a bracket member 31, a touch member 32, a supporting element 33 and two elastic elements 34. The touch member 32 is installed between a first strip part 311 and a second strip part 312 of the bracket member 31. The supporting element 33 is installed on the touch member 32. Moreover, the supporting element 33 is arranged between the two elastic elements 34 and the touch member 32. Each elastic element 34 comprises a swinging part 341, a fixing part 342 and a shaft part 343. The shaft part 343 is arranged between the swinging part 341 and the fixing part 342. The two swinging parts 341 are located at two opposite sides of the supporting element 33, respectively. The two fixing parts 342 are installed on the first strip part 311 and the second strip part 312 of the bracket member 31, respectively. That is, the supporting element 33 is fixed on the bracket member 31 through the two elastic elements 34. In an embodiment, the width W1 of the swinging part 341 (or the width W1 of the fixing part 342) is larger than the width W2 of the shaft part 343. When an external force is applied to the touch member 32, the touch member 32 is swung relative to the bracket member 31 by using the two shaft parts 343 as the fulcrum. During the process of swinging the touch member 32, the two shaft parts 343 are subjected to deformation. Consequently, the supporting element 33 and the swinging parts 341 are swung relative to the fixing parts 342.

In an embodiment, each elastic element 34 is a resilience sheet with a thickness of 0.1 mm. The width W1 of the swinging part 341 (or the width W1 of the fixing part 342) of each elastic element 34 is in the range between 5 mm and 10 mm. The width W2 of the shaft part 343 of each elastic element 34 is in the range between 3 mm and 6 mm. Since the elastic elements 34 are resilience sheets, the resilience sheets can be undergo a laser welding process. In such way, it is not necessary to apply additional bonding material to the region between the elastic elements 34 and the supporting element 33 to fix the elastic elements 34 on the supporting element 33. Consequently, the fabricating cost of the touchpad module 3.

Please refer to FIGS. 5, 6 and 7. In this embodiment, the touchpad module 3 further comprises two ribs 35. The two ribs 35 are installed on the two swinging parts 341 of the two elastic elements 34, respectively. The two swinging parts 341 are arranged between the two ribs 35 and the supporting element 33. Moreover, the two swinging parts 341 are protruded from the corresponding swinging parts 341 and extended in a first direction D1 away from the swinging parts 341. The two swinging parts 341 can be swung relative to the corresponding fixing parts 342 by using the corresponding ribs 35 as fulcrums. Moreover, the two ribs 35 are extended in a second direction D2. The first strip part 311 and the second strip part 312 of the bracket member 31 are extended in a third direction D3. The first direction D1 (i.e., the protrusion direction of the ribs 35), the second direction D2 (i.e., the extension direction of the ribs 35) and the third direction D3 (i.e., the extension direction of the first strip part 311 and the second strip part 312) are not in parallel with each other. Preferably but not exclusively, the first direction D1, the second direction D2 and the third direction D3 are perpendicular to each other. In this embodiment, the two ribs 35 have C-shaped curvy surfaces. It is noted that the curvy surfaces of the two ribs 35 are not restricted. In case that the two ribs 35 have C-shaped curvy surfaces, the swinging parts 341 are swung more smoothly and the touch member 32 is swung relative to the bracket member 31 more stably.

As shown in the drawings, the fixing frame 44 of the computing device 4 comprises a bottom plate 440 and a support plate 442. The touchpad module 3 is supported by the bottom plate 440. The support plate 442 is installed on the bottom plate 440. The support plate 442 is arranged between the touchpad module 3 and the bottom plate 440 of the fixing frame 44. The two ribs 35 of the touchpad module 3 are supported on the support plate 442. Preferably but not exclusively, the support plate 442 is made of a metallic material. By the support plate 442, the two ribs 35 of the touchpad module 3 are not in direct contact with the bottom plate 440 of the fixing frame 44. Moreover, while the two swinging parts 341 are repeatedly swung relative to the corresponding fixing parts 342 by using the corresponding ribs 35 as fulcrums, the two ribs 35 are not directly rubbed against the bottom plate 440 of the fixing frame 44. Consequently, the fixing frame 44 is not damaged.

Please refer to FIGS. 5, 6 and 7. In an embodiment, the touchpad module 3 further comprises a first adhesive layer 36. The first adhesive layer 36 is arranged between the supporting element 33 and the touch member 32. The supporting element 33 is attached on the touch member 32 through the first adhesive layer 36. In this embodiment, the touch member 32 comprises a circuit board 321 and a covering plate 322. The circuit board 321 is arranged between the covering plate 322 and the supporting element 33. Moreover, the supporting element 33 is installed on the circuit board 321. Moreover, the touchpad module 3 further comprises a second adhesive layer 37. The second adhesive layer 37 is arranged between the circuit board 321 and the covering plate 322. The circuit board 321 and the covering plate 322 are combined together through the second adhesive layer 37. Preferably but not exclusively, the first adhesive layer 36 and the second adhesive layer 37 are pressure sensitive adhesives (PSA). Preferably but not exclusively, the covering plate 322 is made of glass.

Please refer to FIGS. 6 and 7 again. In this embodiment, the touchpad module 3 further comprises a first fastening element 38 and a second fastening element 39. The fixing parts 342 of the two elastic elements 34 comprise a first opening 3421 and a second opening 3422, respectively. The first strip part 311 and the second strip part 312 of the bracket member 31 comprise a first screw hole 3110 and a second screw hole 3120, respectively. The first fastening element 38 is penetrated through the first opening 3421 and tightened into the first screw hole 3110. The second fastening element 39 is penetrated through the second opening 3422 and tightened into the second screw hole 3120. Consequently, the fixing parts 342 of the two elastic elements 34 are fixed on the first strip part 311 and the second strip part 312 of the bracket member 31, respectively.

Please refer to FIGS. 5, 6 and 7 again. In this embodiment, the bracket member 31 further comprises a third strip part 313, a fourth strip part 314 and a triggering part 315. The third strip part 313 and the fourth strip part 314 are opposed to each other. The third strip part 313 and the fourth strip part 314 are arranged between the first strip part 311 and the second strip part 312. The triggering part 315 is protruded from the fourth strip part 314 and extended in the direction toward the third strip part 313. Moreover, the triggering part 315 is located under the touch member 32. The touch member 32 further comprises a switch 320 corresponding to the triggering part 315. The supporting element 33 is located beside the third strip part 313 of the bracket member 31. When an external force is applied to the touchpad module 3, the touch member 32 is swung toward the triggering part 315 by using the shaft parts 343 of the elastic elements 34 as the fulcrums. As the touch member 32 is swung, the switch 320 of the touch member 32 is contacted with the triggering part 315 of the bracket member 31 to issue an enabling signal to the computing device 4. According to the enabling signal, the computing device 4 executes a corresponding function.

Figure 8:
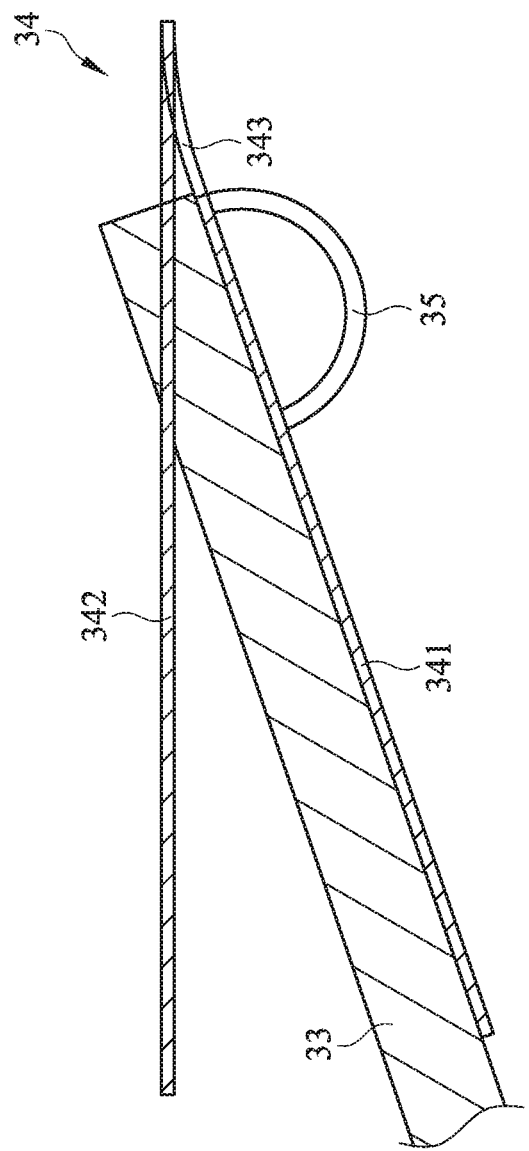
FIG. 8 schematically illustrates the operation of the elastic element of the touchpad module as shown in FIGS. 5, 6 and 7.

FIG. 8 schematically illustrates the operation of the elastic element of the touchpad module as shown in FIGS. 5, 6 and 7. Please refer to FIGS. 5 and 8. When the external force is applied to the touchpad module 3, the touch member 32 is swung toward the triggering part 315 by using the shaft parts 343 of the elastic elements 34 as the fulcrums. Consequently, the switch 320 of the touch member 32 is triggered by the triggering part 315. During the process of swinging the touch member 32, the shaft parts 343 of the elastic elements 34 are subjected to deformation. Consequently, the two swinging parts 341 and the supporting element 33 are swung relative to the fixing parts 342 by using the ribs 35 as the fulcrums. When the external force exerted on the touchpad module 3 is eliminated, the shaft parts 343 of the elastic elements 34 are restored to their original shapes in response to the restoring forces of the two elastic elements 34. During the process of restoring the shaft parts 343 to their original shapes, the touch member 32 is swung away from the triggering part 315 of the bracket member 31. In addition, the two swinging parts 341 and the supporting element 33 are swung relative to the fixing parts 342 by using the ribs 35 as the fulcrums, and the two swinging parts 341 and the supporting element 33 are returned to their original positions (see FIG. 5).

Figure 9:
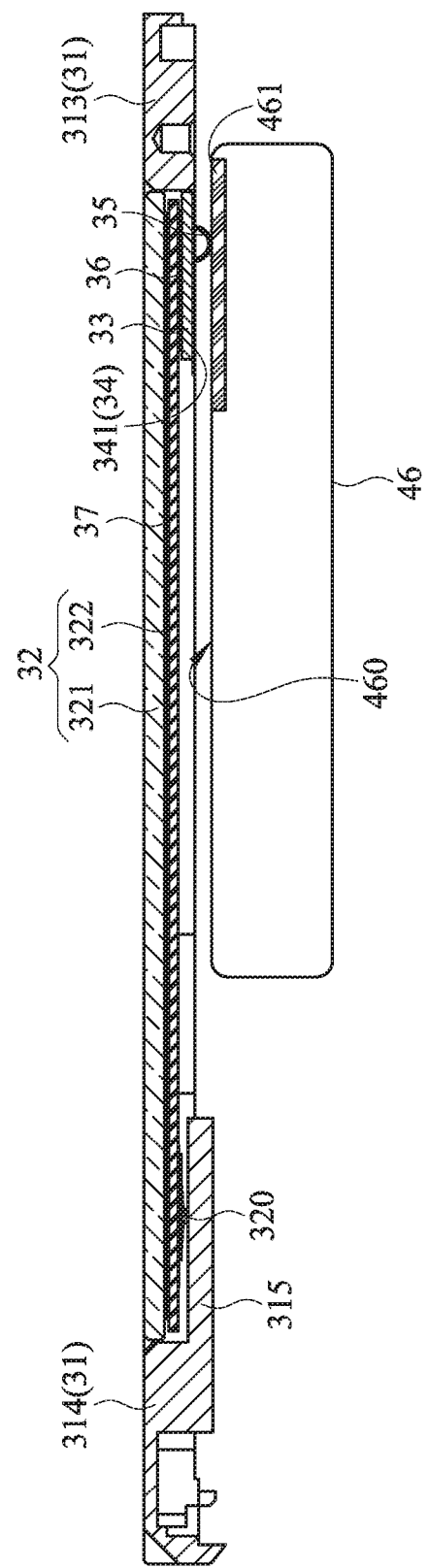
FIG. 9 is a schematic cross-sectional view illustrating a computing device with a touchpad module according to a second embodiment of the present invention.

FIG. 9 is a schematic cross-sectional view illustrating a computing device with a touchpad module according to a second embodiment of the present invention. The structure of the computing device of this embodiment is similar to that of FIG. 5. In comparison with FIG. 5, the computing device of this embodiment further comprises a battery 46. The battery 46 is located under the touchpad module 3. The battery 46 comprises a top surface 460 and a support plate 461. The top surface 460 faces the touchpad module 3. The support plate 461 is disposed on the top surface 460. The support plate 461 is arranged between the touchpad module 3 and the top surface 460 of the battery 460. The two ribs 35 of the touchpad module 3 are supported on the support plate 461. Preferably but not exclusively, the support plate 461 is made of a metallic material. By the support plate 461, the two ribs 35 of the touchpad module 3 are not in direct contact with the top surface 460 of the battery 46. Moreover, while the two swinging parts 341 are repeatedly swung relative to the corresponding fixing parts 342 by using the corresponding ribs 35 as fulcrums, the two ribs 35 are not directly rubbed against the top surface 460 of the battery 460. Consequently, the battery 46 is not damaged.

Figure 10:
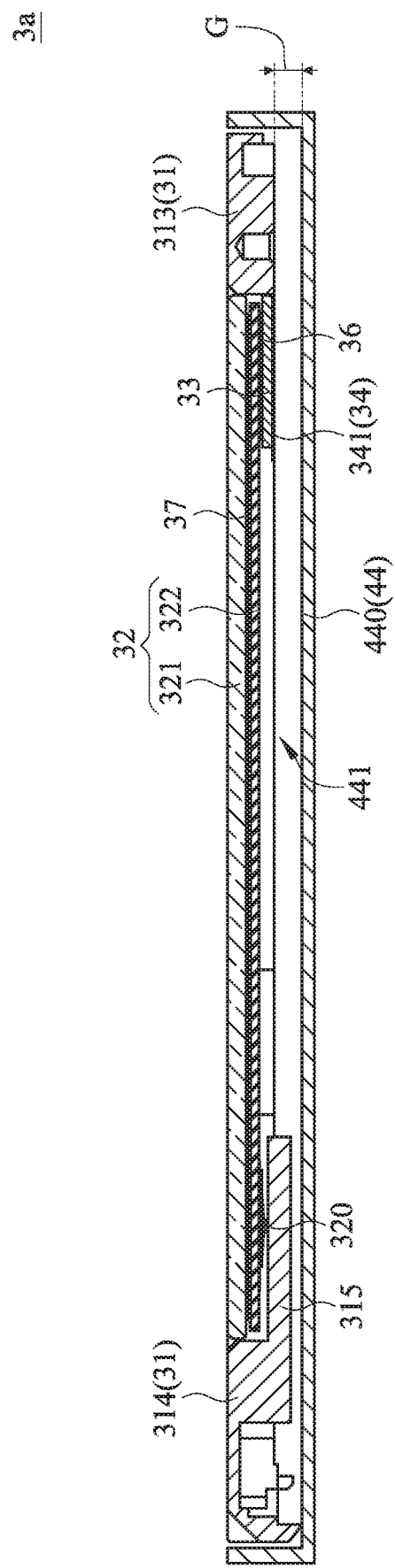
FIG. 10 is a schematic cross-sectional view illustrating a computing device with a touchpad module according to a third embodiment of the present invention.

FIG. 10 is a schematic cross-sectional view illustrating a computing device with a touchpad module according to a third embodiment of the present invention. The structure of the computing device of this embodiment is similar to that of FIG. 5. In comparison with FIG. 5, the touchpad module 3a of the computing device of this embodiment further comprises is not equipped with the two ribs. In other words, there is a gap G between the touchpad module 3a and the bottom plate 440 of the fixing frame 44. Even if the touchpad module 3a has not ribs to be in contact with the fixing frame 44, the touch member 32 can be swung relative to the bracket member 31 by using the shaft parts 343 of the elastic elements 34 as the fulcrums. During the process of swinging the touch member 32, the shaft parts 343 of the elastic elements 34 are subjected to deformation. Consequently, the two swinging parts 341 and the supporting element 33 are swung relative to the fixing parts 342.

From the above descriptions, the present invention provides the touchpad module and the computing device with the touchpad module. The touchpad module comprises two elastic elements. Each elastic element comprises a swinging part, a fixing part and a shaft part. When an external force is applied to the touchpad module, the touch member is swung relative to the bracket member by using the shaft parts as fulcrums. Moreover, the width of the shaft part is smaller than the width of the swinging part and the width of the fixing part. During the process of swinging the touch member, the shaft parts are subjected to deformation. Consequently, the supporting element and the swinging parts are swung relative to the fixing parts. Due to this structural design, the swinging action of the touch member with respect to the bracket member is stable (i.e., not aslant). Moreover, since the structural design of the touchpad module is simple and the process of assembling the components of the touchpad module is easy, the fabricating cost is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module comprising:
   a bracket member comprising a first strip part and a second strip part, which are opposed to each other;
   a touch member arranged between the first strip part and the second strip part;
   a supporting element installed on the touch member; and
   two elastic elements, wherein the supporting element is arranged between the two elastic elements and the touch member, and each of the elastic elements comprises a swinging part, a fixing part and a shaft part between the swinging part and the fixing part, wherein the swinging parts of the two elastic elements are respectively located at two opposite sides of the supporting element, the fixing parts of the two elastic elements are respectively installed on the first strip part and the second strip part, and the swinging part and the fixing part are wider than the shaft portion,
   wherein when an external force is applied to the touchpad module, the touch member is swung relative to the bracket member by using the shaft parts of the two elastic elements as fulcrums, wherein while the touch member is swung, the shaft parts are subjected to deformation and the supporting element and the swinging parts are swung relative to the fixing parts.

2. The touchpad module according to claim 1, wherein the touchpad module further comprises two ribs, wherein the two ribs are respectively installed on the corresponding swinging parts, and the swinging parts are arranged between the corresponding ribs and the supporting element, wherein the ribs are protruded from the corresponding swinging parts and extended in a first direction away from the swinging parts, and the swinging parts are swung relative to the corresponding fixing parts by using the corresponding ribs as fulcrums.

3. The touchpad module according to claim 2, wherein the ribs are extended in a second direction, and the first strip part and the second strip part of the bracket member are extended in a third direction, wherein the first direction, the second direction and the third direction are in parallel with each other.

4. The touchpad module according to claim 2, wherein each of the ribs has a curvy surface.

5. The touchpad module according to claim 2, wherein the computing device further comprises a battery, and the battery comprises a top surface and a support plate, wherein the top surface faces the touchpad module, the support plate is disposed on the top surface, and the ribs of the touchpad module are supported on the support plate.

6. The touchpad module according to claim 2, wherein the computing device comprises a fixing frame, and the touchpad module is disposed within the fixing frame, wherein the fixing frame comprises a bottom plate and a support plate, wherein the touchpad module is supported by the bottom plate, the support plate is installed on the bottom plate, and the ribs of the touchpad module are supported on the support plate.

7. The touchpad module according to claim 1, wherein each of the fixing part and the swinging part has a width in a range between 5 mm and 10 mm, and the shaft part has a thickness in a range between 3 mm and 6 mm.

8. The touchpad module according to claim 1, wherein a thickness of the elastic element is 0.1 mm.

9. The touchpad module according to claim 1, wherein the touchpad module further comprises a first adhesive layer, and the first adhesive layer is arranged between the supporting element and the touch member, wherein the supporting element is attached on the touch member through the first adhesive layer.

10. The touchpad module according to claim 1, wherein the touch member comprises a circuit board and a covering plate, wherein the circuit board is arranged between the covering plate and the supporting element, and the supporting element is installed on the circuit board.

11. The touchpad module according to claim 10, wherein the touchpad module further comprises a second adhesive layer, and the second adhesive layer is arranged between the circuit board and the covering plate, wherein the circuit board and the covering plate are combined together through the second adhesive layer.

12. The touchpad module according to claim 1, wherein the touchpad module further comprises a first fastening element and a second fastening element, each of the fixing parts comprises a first opening and a second opening, respectively, and the first strip part and the second strip part comprise a first screw hole and a second screw hole, respectively, wherein the first fastening element is penetrated through the first opening and tightened into the first screw hole, and the second fastening element is penetrated through the second opening and tightened into the second screw hole, so that the fixing parts are respectively fixed on the first strip part and the second strip part.

13. The touchpad module according to claim 1, wherein the bracket member further comprises a third strip part, a fourth strip part and a triggering part, wherein the third strip part and the fourth strip part are opposed to each other, the third strip part and the fourth strip part are arranged between the first strip part and the second strip part, the supporting element is located beside the third strip part, the triggering part is protruded from the fourth strip part and extended in a direction toward the third strip part, the triggering part is located under the touch member, and the touch member further comprises a switch corresponding to the triggering part, wherein when the external force is applied to the touchpad module, the touch member is swung toward the triggering part by using the shaft parts of the two elastic elements as the fulcrums, so that the switch is triggered by the triggering part.

14. A computing device, comprising:
   a casing, wherein a fixing frame is concavely formed in the casing;
   a processor disposed within the casing; and
   a touchpad module disposed within the casing and electrically connected with the processor, wherein the touchpad module comprises:
      a bracket member comprising a first strip part and a second strip part, which are opposed to each other;
      a touch member arranged between the first strip part and the second strip part;
      a supporting element installed on the touch member; and
      two elastic elements, wherein the supporting element is arranged between the two elastic elements and the touch member, and each of the elastic elements comprises a swinging part, a fixing part and a shaft part between the swinging part and the fixing part, wherein the swinging parts of the two elastic elements are respectively located at two opposite sides of the supporting element, the fixing parts of the two elastic elements are respectively installed on the first strip part and the second strip part, and the swinging part and the fixing part are wider than the shaft portion, wherein when an external force is applied to the touchpad module, the touch member is swung relative to the bracket member by using the shaft parts of the two elastic elements as a fulcrum, wherein while the touch member is swung, the shaft parts are subjected to deformation and the supporting element and the swinging parts are swung relative to the fixing parts.

* * * * *